United States Patent Office 3,341,633
Patented Sept. 12, 1967

3,341,633
REACTION OF O,O-DIHYDROCARBYL PHOSPHORODITHIOIC ACIDS WITH EPOXIDES
Peter A. Asseff, Euclid, Ohio, assignor to The Lubrizol Corporation, Wickliffe, Ohio, a corporation of Ohio
No Drawing. Filed Jan. 27, 1955, Ser. No. 484,592
9 Claims. (Cl. 260—978)

This invention relates to the chemistry of organo-phosphorus compounds and more particularly to the chemistry of phosphorothioic acids. In a still more particular consideration it relates to a process whereby these acids are converted to neutral products.

The products prepared by the process of this invention are useful as gear lubricant additives. Gear lubricants which contain such products have very good extreme-pressure qualities. Furthermore, these products may be used as starting materials for the preparation of still other effective lubricant additives.

It is a principal object of the invention to provide a novel process for the preparation of certain lubricant additives.

It is also an object of the invention to provide a convenient process for the preparation of neutral phosphorus- and sulfur-containing compositions.

These and other objects are accomplished by the process which comprises the reaction of a phosphorothioic acid with an organic epoxide. The process may be defined more narrowly as comprising the reaction of a phosphorothioic acid having the structure

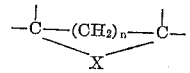

where R and R' are the same or different non-functional organic radicals, and X and X' are selected from the class consisting of oxygen and sulfur, with an approximately equivalent amount of an organic compound selected from the class consisting of epoxides and thioepoxides.

It will be seen from the above formula that the phosphorothioic acid starting materials described herein may contain 1, 2, 3 and 4 sulfur atoms. It is preferred, however, to use the phosphorodithioic acids, in which there are present 2 sulfur atoms per molecule.

The non-functional organic radicals of the above structure may be aliphatic or aromatic and may contain organic or inorganic substituents. The term non-functional is used to indicate that the radicals do not take part in or have any significant influence upon the reaction of the process. Illustrative types of organic radicals include alkyl, cycloalkyl, aryl, aralkyl, alkaryl, alkenyl, cycloalkenyl, etc. and the substituted derivatives of these, e.g., nitro-, halo-, alkoxy-, hydroxy-, carboxy-, etc. Generally these organic radicals are hydrocarbon radicals. Particularly useful products for use in lubricants are those derived from dialkyl phosphorothioic acids.

As indicated previously an especially preferable class of phosphorothioic acids are phosphorodithioic acids. These phosphorodithioic acids may be prepared by the well-known reaction of phosphorus pentasulfide with the hydroxy compound which corresponds to the organic radicals R and R'. This reaction is illustrated by the action of phosphorous pentasulfide on ethyl alcohol to produce O,O-diethyl phosphorodithioic acid. In similar fashion, aliphatic hydrogen compounds such as propyl, butyl, iso-butyl, amyl, hexyl, cyclohexyl, n-octyl, iso-octyl, lauryl, etc. alcohols or aromatic hydroxy compounds such as phenol, alkylated phenols, naphthols, alkylated naphthols, and the like may be reacted with phosphorus pentasulfide to produce phosphorodithioic acids of utility as starting materials for the present invention.

The organic epoxides and thioepoxides may be represented as having the structural grouping

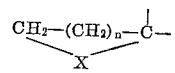

where $n$ is 1 or 0, and X is oxygen or sulfur, and those epoxides and thioepoxides are preferred in which one of the above-indicated carbon atoms is also attached to two hydrogen atoms. In other words, the preferred epoxides and thioepoxides are terminal epoxides and have the structural grouping

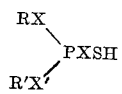

where $n$ and X are as described above. These have been given the name "terminal" epoxides and thioepoxides because they may be thought of as being derived in most instances from a vinyl compound or one which has a terminal olefinic double bond.

The term "epoxide" is used hereafter in a broad sense to denote both the epoxides and the thioepoxides.

Specific examples of suitable epoxides include ethylene oxide, propylene oxide, epichlorohydrin, 1-butene oxide, butadiene monoxide, 1-amylene oxide, styrene oxide, epoxidized fatty oils, epoxy stearic acid, propylene sulfide, etc.

The reaction of the phosphorus dithioic acid with an organic epoxide is exothermic. Although it is not necessary, it is preferred to control the temperature of the reaction mixture so that it is reasonably constant throughout the course of the reaction. The temperature of the reaction may be as low as —60° C. or lower and on the other hand it may be as high as 100° C. or even higher. Generally for reasons of economy it is preferred to carry out the process at room temperature.

The reaction appears to involve equimolar proportions of the phosphorus dithioic acid and the epoxide. The identity of the product has not been established and so it is best described in terms of its method of preparation. The products are neutral, have a phosphorus to sulfur ratio of 1:2, and as indicated before appear to result from the reaction of one mole each of phosphorus dithioic acid and epoxide.

It usually is convenient to use an excessive amount of the organic epoxide so as to insure a maximum yield. In most instances, the epoxide is sufficiently volatile that its removal from the reaction mixture, after the reaction is finished, is a simple operation. In some cases, it is sufficient merely to allow the excess epoxide to evaporate from the product at room temperature, or the product may be flushed with an inert gas such as nitrogen.

The process of the invention is illustrated in further detail by the following specific examples:

EXAMPLE 1

To 1,780 grams (5 moles) of O,O-di-(2-ethylhexyl) phosphorodithioic acid, stirred at room temperature, there was added portionwise 319 grams (5.5 moles) of propylene oxide. The ensuing reaction was quite exothermic and the temperature rose to 83° C. within 15 minutes. The temperature was maintained at 90–91° C. for three hours, whereupon an additional 29 grams (0.5 mole) of propylene oxide was added. This mixture was maintained at 90° C. for another hour and then concentrated by heating to a final temperature of 90° C./28 mm. The dark yellow liquid residue showed the following analysis: S, 15.4%; P, 7.4%.

EXAMPLE 2

To 4,940 grams (15 moles) of O,O-di-(2-methylpentyl-4) phosphorodithioic acid there was added dropwise over a period of two hours with stirring at room temperature, 1,740 grams (30 moles) of propylene oxide. The temperature was maintained at 35–40° C. throughout the addition and for an additional two hours. Then the mixture was heated at reflux temperature (85–95° C.) and concentrated by heating to a final temperature of 105° C./21 mm. The residue was filtered to give a brown filtrate having the following analysis: S, 17.6%; P, 8.9%.

EXAMPLE 3

To 628 grams (2 moles) of O,O-di-(2-methylpentyl-4) phosphorodithioic acid there was added portionwise with stirring over a period of one hour, 184 grams (2 moles) of epichlorohydrin. The temperature was maintained with external cooling at 65–70° C. throughout this period and the mixture was stirred for an additional hour, during which time the temperature receded to 30° C. The product was a green, non-viscous liquid having the following analysis: S, 16.1%; P, 7.8%; Cl, 8.6%.

EXAMPLE 4

A sample of O,O-di-(isopropyl) phosphorodithioic acid weighing 514 grams (2 moles) was treated dropwise at room temperature with a small portion of propylene oxide. The temperature rose rapidly to 96° C., whereupon the addition of propylene oxide was halted. When the temperature had fallen to 30° C., the addition of propylene oxide was resumed until a total of 224 grams (3.9 moles) had been added, the temperature being maintained below 60° C. The resulting mixture then was heated for three hours at 60–65° C. and then concentrated by heating to a final temperature of 115° C./20 mm. The liquid residue showed the following analysis: S, 23.8%; P, 11.4%.

EXAMPLE 5

To 193 grams (0.5 mole) of O,O-di-(2-ethylhexyl) phosphorodithioic acid there was added portionwise at room temperature 78 grams (0.65 mole) of styrene oxide. The exothermic reaction caused the temperature to rise to 75° C. which temperature was maintained for an additional 3.5 hours. The resulting product mixture was washed with dilute aqueous sodium carbonate and then with water. This material was dried with magnesium sulfate, then filtered and the filtrate concentrated by heating to a final temperature of 100° C./6 mm. The yellow, fluid residue showed the following analysis: S, 12.8%; P, 6.3%.

EXAMPLE 6

Four hundred eighteen grams (7.2 moles) of propylene oxide was added dropwise over a period of one hour to 1,854 grams (6 moles) of O,O-di-(n-hexyl) phosphorodithioic acid. The temperature was maintained at 53–70° C. by means of external cooling throughout the addition and for an additional hour. The resulting mixture was concentrated by heating to a final temperature of 67° C./110 mm. and the fluid residue shown to have the following analysis: S, 17.7%; P, 8.3%.

The phosphorothioic acid-epoxide reaction products are neutral compositions containing the residues of equimolar quantities of the phosphorodithioic acid and the epoxide. As such they are valuable materials and may be used in many applications. They are valuable also as intermediates in the preparation of certain metal-containing derivatives which in themselves are useful materials. The preparation of these metal-containing derivatives involves the further treatment of the phosphorothioic acid-epoxide reaction product with a basically reacting inorganic metal compound.

Illustrative examples of basically reacting inorganic metal compounds include principally the metal oxides such as barium oxide, zinc oxide, calcium oxide, cadmium oxide, etc. Other basically reacting inorganic metal compounds include the hydroxides, carbonates, etc.

The reaction by which the above-described derivatives are prepared is effected merely by mixing and heating the two components.

The following examples illustrate the reaction:

EXAMPLE 7

A benzene solution of 2207 grams (5.2 equivalents) of a product prepared as in Example 3 was treated portionwise at 80° C. with 244 grams (6.0 equivalents) of zinc oxide. The resulting mixture was heated at reflux temperature and water collected in a distillation trap until the theoretical amount of water had been removed. The mixture was filtered through a filter aid and the filtrate freed of benzene by distillation. The amber liquid residue showed the following analyses:

| | Percent |
|---|---|
| Phosphorus | 7.7 |
| Sulfur | 16.2 |
| Zinc | 8.5 |

EXAMPLE 8

A solution of 250 grams (0.9 equivalent) of a product prepared as in Example 4 in 500 grams of benzene was treated with 44 grams (0.55 equivalent) of cupric oxide. This mixture was heated at reflux temperature for 44 hours during which time the theoretical amount of water was collected in a distillation trap. The product mixture was filtered through hyflo and the filtrate concentrated by heating to a final temperature of 100° C. at 20 mm. The residue was a brown liquid with the following analyses:

| | Percent |
|---|---|
| Phosphorus | 9.4 |
| Sulfur | 21.5 |
| Copper | 6.4 |

EXAMPLE 9

A mixture of 50 grams (0.18 equivalent) of a product prepared as in Example 4, 19.5 grams (0.09 equivalent) of mercuric oxide and 150 ml. of benzene was prepared and heated at reflux temperature for 30 minutes, during which time the theoretical quantity of water separated. The product mixture was freed of benzene by distillation to yield a dark liquid residue which showed the following analyses:

| | Percent |
|---|---|
| Phosphorus | 8.3 |
| Sulfur | 17.2 |
| Mercury | 26.8 |

Other modes of applying the principle of the invention may be employed, change being made as regards the details described, provided the features stated in any of the following claims, or the equivalent of such, be employed.

I therefore particularly point out and distinctly claim as my invention:

1. A method for the preparation of a neutral phosphorus- and sulfur-containing composition which comprises reacting, at a temperature between about −60° and 100° C., a phosphorodithioic acid having the general formula

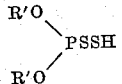

wherein each of R and R' is a hydrocarbon radical or a halo, nitro or alkoxy derivative thereof, with an approximately equivalent amount of an unsubstituted or aryl- or halogen-substituted alkylene oxide.

2. The method of claim 1 wherein R and R' are alkyl radicals.

3. The method of claim 1 wherein the alkylene oxide is a terminal epoxide.

4. The method of claim 3 wherein the epoxide is propylene oxide.

5. The method of claim 3 wherein the epoxide is ethylene oxide.

6. The method of claim 3 wherein the epoxide is epichlorohydrin.

7. The method of claim 3 wherein R and R' are alkyl radicals.

8. A process which comprises the steps of reacting a di-organo substitute dithiophosphoric acid with an epoxide at a temperature below 95° C. and recovering the reaction product thereof, the organo groups of the dithiophosphoric acid containing in the range of 3–12 carbon atoms per radical and being selected from the group consisting of aliphatic, alicyclic and mono-alkyl phenyl radicals, and said epoxide containing in the range of 2–8 carbon atoms per molecule and being selected from the group consisting of epoxy-alkanes, epoxy-alkenes and styrene oxide.

9. The process of preparing neutral phosphorus- and sulfur-containing compositions which comprises the reaction at a temperature within the range of about −60° C. to about 100° C. of a dialkyl phosphorodithioic acid with an approximately equivalent amount of propylene oxide.

References Cited

UNITED STATES PATENTS

| | | | |
|---|---|---|---|
| 2,266,514 | 12/1941 | Romieux | 260—461.112 |
| 2,358,305 | 9/1944 | Cook et al. | 260—461.1 |
| 2,372,244 | 3/1945 | Adams et al. | 260—461.1 |
| 2,478,377 | 8/1949 | Dickey et al. | 260—461.312 |
| 2,540,084 | 2/1951 | Asseff | 260—429.9 |
| 2,610,978 | 9/1952 | Lanham | 260—461.312 |
| 2,619,508 | 11/1952 | Mikecha | 260—461.1 |
| 2,680,123 | 6/1954 | Mulvany | 260—429.9 |
| 2,690,451 | 9/1954 | Gilbert et al. | 260—461.1 |
| 2,692,891 | 10/1954 | Young et al. | 260—461.1 |
| 2,783,204 | 2/1957 | McDermott | 260—461.112 |
| 2,844,616 | 7/1958 | McDermott | 260—461.112 |

OTHER REFERENCES

Kosolapoff, Organo Phosphorus Compounds, John Wiley and Sons, Inc. New York, N.Y. 1950 pages 220 and 230.

Elderfield — Heterocyclic Compounds — pages 22–32 John Wiley & Sons 1950.

CHARLES B. PARKER, *Primary Examiner.*

WILLIAM G. WILES, A. H. WINKELSTEN,

*Examiners.*

C. G. LOVE, A. MAZEL, D. D. HORWITZ, R. L. RAYMOND, *Assistant Examiners.*